J. ATKINS.
Harvester.
No. 1,632. Reissued March 8. 1864.
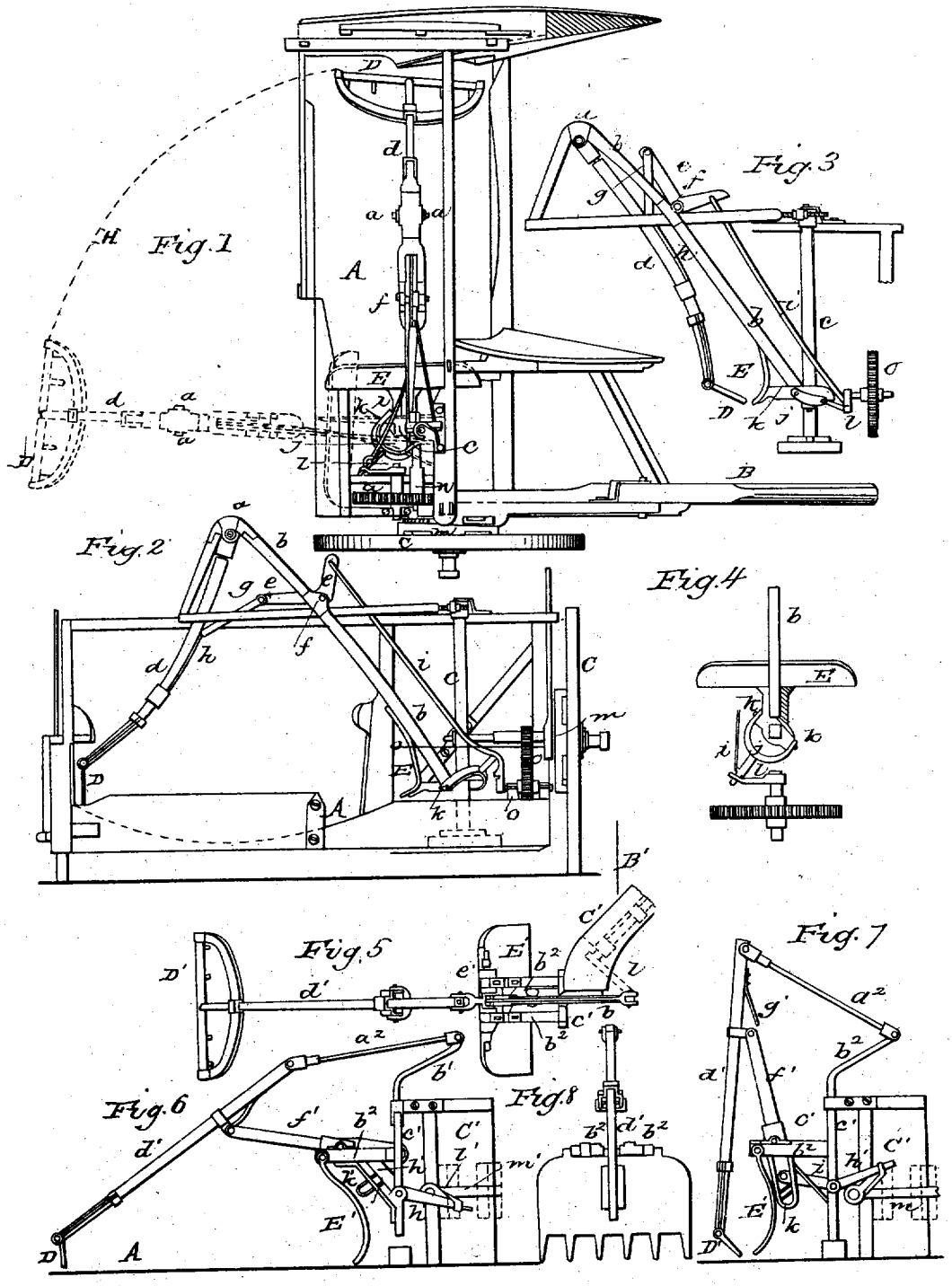
N. PETERS. Photo-Lithographer, Washington, D. C.

UNITED STATES PATENT OFFICE.

WALTER WRIGHT, OF CHICAGO, ILLINOIS, ASSIGNEE, BY MESNE ASSIGNMENTS, OF JEARUM ATKINS.

IMPROVEMENT IN RAKES TO GRAIN-HARVESTERS.

Specification forming part of Letters Patent No. 9,479, dated December 21, 1852; Reissue No. 282, dated October 31, 1854; Reissue No. 1,632, dated March 8, 1864.

*To all whom it may concern:*

Be it known that JEARUM ATKINS, of Chelsea, in the county of Will and State of Illinois, the assignor to JOHN S. WRIGHT, who is assignor to JAMES CLAPP, who is assignor to WALTER WRIGHT, did invent a certain new and useful Improvement in Rakes for Harvesting-Machines; and I, the said WALTER WRIGHT, do hereby declare the following to be a full, clear, and exact description of the same, which will be better understood by reference to the accompanying drawings, which form part of this specification.

The object of this invention is to provide a rake which, by its automatic movement, shall successfully rake the grain from the platform as it is cut and deliver it upon the inner side of the swath in gavels ready to be bound. (By the "inner side," as used in this specification, I mean that side of the swath or of the machine which is farthest from the uncut grain.) To effect this object I use a vertical shaft or crane-post, to which the rake is to be attached, (either directly or indirectly.) This shaft I place on the inner side of the reaper, and is so contrived that it shall have a rotary or oscillating motion upon its own axis, by means of which the rake, after it has removed one gavel, is brought back to its proper position for raking a new one without becoming entangled either with the standing grain or with that which is cut and is lying upon the platform.

I am aware that several kinds of automatic rakes have been contrived previous to the application for the original patent in this case; but they are, as I believe, all liable to great objections, which have been successfully obviated by the use of a crane-post or its equivalent, as herein proposed. In one class of these previous contrivances the rake is actuated by a rotating or oscillating shaft placed perpendicularly across the track and parallel to the platform. By this arrangement the gavel is drawn off directly in the rear of the platform, and extends across the whole breadth of the swath, so as to be directly in the track of the horses on their next round, whereas by the contrivance herein proposed the gavel is removed to the inner side of the swath and is entirely out of the way of the horses in their subsequent movements. In another class of cases the actuating-shaft or its equivalent is placed parallel both to the platform and to the track of the machine. By this contrivance the gavel is deposited on the inner side of the swath; but it has been found impracticable, after raking off one gavel from the platform, to bring the rake back to its proper position for raking a second one without entangling it with either the cut or the uncut grain. The use of a vertical shaft, as herein contemplated, enables me to obviate both these difficulties. I know that a vertical shaft having a motion upon its own axis has long since been used for the purpose of raking automatically. Such a contrivance is found in the patent of Isaac Lard, dated November 20, 1846; but that rake was intended only for a grass-cutting machine, and would be wholly unfit for raking grain which was to be bound. It was, in fact, only a rotary broom, which, though it might clear the track, must leave the straw in total confusion.

In 1849 Nelson Platt obtained a patent for an automatic raking device, in which he used a rake moving in a segment of a horizontal circle around a vertical shaft or its equivalent, by which the gavel was deposited on the inner side of the swath; but his plan required the use of another rake to sweep the grain across the platform, so as to bring it within the reach of this revolving rake. The use of two rakes in this manner rendered the machine necessarily cumbrous and complicated, and the contrivance never went into practical use. The present invention accomplishes with one rake all that Platt attempted with two, by which means a much more simple and successful machine is produced.

In July, 1851, Palmer & Williams patented one raking device and Wm. H. Seymour another, in each of which a single rake was used having an oscillating motion through the segment of a horizontal circle. By this means the gavel is deposited on the inner side of the track, and the rake then makes its way back to the proper place for commencing to rake another gavel without becoming entangled with the standing or with the cut grain. Either of these contrivances was doubtless greatly superior to any automatic rake of a previous date; but both seem to me liable to great objections. Each had at the outer end of the rake-head a guide to regulate the movement of the rake, keeping it down upon the platform when moving forward, and elevating it out of the way of the unraked grain when returning backward; but although by this means the rake itself may avoid entanglement the guides which control its movements cannot do so. They must be greatly in the way, and thus create embarrassment in the working of the machine.

While such was the state of the art the raking device for which an amended patent is now sought was patented. It consists of a vertical shaft placed on the inner side of the machine, by the rotation or oscillation of which the rake is actuated, and upon which shaft, or upon the same side of the machine with it, are placed the contrivances which support, guide, and impel the rake throughout its whole course. By this means a success has been obtained which is entirely satisfactory. A single rake thus operated, without becoming in any way entangled with the grain, is made to rake the gavel and deposit it entirely out of the way of the subsequent movements of the horses, so that the entire field may be cut, if desirable, before any portion of the grain is bound.

I wish it also to be understood that in this whole specification the term "vertical," as applied to the crane-post, is used in contradistinction to "horizontal."

Having thus stated the general principle of this invention, I will now proceed to point out in detail one of the methods by which that principle is to be carried into practical effect, in order to enable any one skilled in the art to make and use the contrivance invented. All this will be more fully understood by reference to the accompanying drawings, which form a part of this specification, and in which—

Figure 1 is a plan of a harvesting-machine in part, with the rake and the mechanical devices for operating it attached. The rake is represented in black lines as collecting the grain on the platform, and in red lines as delivering the gavel on the inner side of the machine. Fig. 2 is an elevation viewed from the rear, showing the rake and its parts as represented in black lines in Fig. 1. Fig. 3 is a similar view, showing mainly the rake and its immediate appurtenances, the rake being represented as in the act of compressing the grain into a gavel, previous to swinging to the position shown in red lines in Fig. 1, for delivery in the rear. Fig. 4 is a detached plan taken through the line *o o*, Fig. 2, of the swivel, chiefly showing its attachment to the crane and operating-crank. Figs. 5, 6, 7, and 8 are views showing a modification of the rake, or different means employed for operating it, Fig. 5 being a plan of the rake, and occupying the same position as that in Fig. 1 in black lines. Fig. 6 is an elevation from the rear, (similar to Fig. 2,) exhibiting the modified rake as commencing to collect the grain on the platform; Fig. 7, a like view, but showing the same rake in the act of compressing the grain, as illustrated in Fig. 3 for the rake first referred to. Fig. 8 is an elevation at right angles to Fig. 6, showing the modified rake and its palm as opening for delivery of the gavel, that is in the position represented by red lines in Fig. 1.

The first part of the following description has reference to the rake and its appurtenances as exhibited in Figs. 1, 2, 3, and 4.

A is the platform of an ordinary harvesting-machine. Its upper surface is of a concave form to correspond with the motion of the rake across it. B is the tongue or draft-bar to which the horses are attached, and C is the driving-wheel which gives motion to the cutter and to the rake.

The rake, by its handle *d*, is suspended at the point *a* to the jib *b* of a crane, of which *c* is the post that swings or turns at the proper interval, working in bearings above and below in the frame of the machine, near the line of draft.

Near the foot of the jib *b*, and attached to it, is a palm or hand, E, which is a board or plate of suitable length and breadth extending across the inner end of the platform when the rake is situated as shown in black lines. A bell-crank, *e*, has its bearing *f* in the jib, and is connected at its one arm by a rod, *g*, to the rake-handle through a spring, *h*. This spring performs the same office as if the rake-handle were slightly flexible, and allows yielding when compressing the grain into a gavel. This same yielding may be provided for by means of a spring connected with the palm E. The other arm of the bell-crank *e* is attached by a rod, *i*, to a swivel, *j*, which is hung at one end on pivots *k k*, Fig. 4, to a cross-brace of the post *c*, connected at its other extremity to a crank, *l*, to which, when the said crank is horizontal, the swivel, as hung to the post *c*, is situated at an angle of about forty-five degrees. The crank *l* revolves and derives its motion through the driving-wheel C by means of a ring, *m*, applied to said driving-wheel, and having teeth on its inner circumference, which mesh into a pinion on the same shaft as the pinion *n*, which gears into a wheel, *o*, on the shaft of the crank *l*.

The rake thus attached and operated will, in starting from the outer side of the machine nearest the standing grain, describe a sweep from the point *a* across the platform directly toward the line of draft, the crane motion of the rake being dormant during such travel by reason of the relative situation of the swivel *j* to the crank *l*, which latter at this period of the rake's motion merely gives a vibratory movement to the swivel *j*, so as to operate the bell-crank *e*, that draws in or closes the rake, thereby gathering and compressing the grain into a gavel, which is tightly held by the rake and the palm E, some little play being allowed in the several parts to prevent the crank *l* from giving the crane motion to the rake when the latter is performing its collecting part of the travel; but when the grain is thus held collected and pressed the crank $l$, by its continued movement, and while passing its lowest point of travel, operates by the angle it proceeds to describe with the swivel upon the post $c$ to turn it for about a quarter of a circle. The rake and palm thus swinging carry the collected grain in between them, such being the exclusive action of the crank as regards its effect upon the rake, until the post is so turned and the jib is so situated in rear of the machine as is represented by red lines in Fig. 1. The crank $l$ then continuing to revolve, the bell-crank $e$ is again acted upon so as to throw out the rake from the palm E and deliver the gavel on the ground in rear of the machine. This being done, the crank $l$, by its continued motion, and while passing its highest point of travel, swings back the rake to the outer side of the platform for a repetition of the action described. The crank $l$, by its swivel-connections, as shown and specified, thus for two alternate quarters of the circle it describes operates exclusively the bell-crank $j$, and alternately for the other two quarters of its circle gives exclusively the crane motion—that is, it simply turns the post $c$, composing for the combined travels of the rake the figure represented by the dotted lines H in Fig. 1.

Figs. 5, 6, 7, and 8 of the drawings refer to a modification of the before-described improvement, and exhibit a rake which, as regards its travel or motion, is mainly similar to that above described, excepting that the palm has at proper intervals a slight vibratory movement communicated to it independently of its motion with the crane-post. In the above figures the rake and its gear, as connected with the platform of the harvesting-machine exclusively, is shown, A′ being the platform. Its upper surface is shown straight, but may be of slightly convex form to correspond with the travel across the rake. B′ is a line indicating the direction and situation of the tongue or draft-bar. C′ is a vertical frame or post erected on the platform. D′ is the rake. Its handle $d'$ is jointed at the upper extremity by a rod, $a^2$, to a jib, $b'$, of a crane, of which C′ is the post. E is the palm or hand. It is provided with teeth at its lower edge, and is suspended to a second jib, $b^2$, attached to the crane-post. It has an inclination given it to press outward from the post by means of a spring, $e'$. $f'$ is a swinging beam hung by trunnions on the jib $b^2$ and jointed at its outer extremity to the rake-handle $d'$, with which it connects at a suitable distance from the top. A spring, $g'$, is attached to the rake-handle. It presses on the swinging beam $f'$ when the rake is being thrown out to its greatest stretch, and serves to start the handle $d'$ from the straight line, which the rod $a^2$ forms with it when the rake is fully extended. The inner end of the swinging beam $f'$ is made with a slot in it, in which works a roller running on a wrist of one arm of a crank-lever, $h'$, that is fast to a horizontal spindle or shaft, $i'$, having its bearings on the crank-post. The other arm of the crank-lever $h'$, forming an obtuse angle with the first arm, has a round extremity fitting loosely into a bent lip of a revolving crank, $l'$, whose shaft $m'$, turning in the post $c'$, lies at an angle of about forty-five degrees with a center line intersecting the crane and rake when situated as in Fig. 6, or at about the same angle with the line of draft B′. A link, $k'$, is hooked to the back of the palm E and to a stud projecting midway, or thereabout, from the side of the lever $h'$. Motion is communicated to the shaft $m'$ by any suitable gearing from the driving-wheel. The crank $l'$, in revolving, produces a similar motion upon the rake as in that described in Figs. 1, 2, 3, and 4, excepting that the rake travels nearly in a straight line across the platform, and, as before observed, the palm has a slight movement given it at intervals.

The operation of the several mechanical devices described in Figs. 5, 6, 7, and 8 for working this latter modified rake are so similar to those already described as to need no special description.

Having thus described one mode of giving effect to this invention, I wish it to be understood that I do not intend to limit myself to the precise contrivances or combination of parts herein described, though I consider the method above set forth as preferable to any that have suggested themselves to my mind for that purpose.

What I claim as new, and desire to secure by Letters Patent, is—

An automatic rake for harvesters, which is supported, guided, and impelled by a vertical shaft and by contrivances sustained by or placed around the same, the said shaft and other contrivances being all placed upon the inner side of the machine or of its platform, when such rake acting alone shall rake and deposit the gavel upon the inner side of the newly-cut swath, and shall then return to its proper position for raking the next gavel in such a way as to swing clear of the standing grain as well as of the unraked grain, which is then lying upon the platform, all by means of a motion of this shaft upon its axis, with its necessary appurtenances, substantially as above described.

WALTER WRIGHT.

Witnesses
E. W. RUSSELL,
T. S. HOWE.